A. LODGE.
DRIVING MECHANISM FOR TOY WAGONS AND THE LIKE.
APPLICATION FILED JAN. 17, 1911.

1,037,028.  
Patented Aug. 27, 1912.

Inventor  
Albert Lodge.

Witnesses  
William Smith.

By Victor J. Evans  
Attorney

UNITED STATES PATENT OFFICE.

ALBERT LODGE, OF PHILADELPHIA, PENNSYLVANIA.

DRIVING MECHANISM FOR TOY WAGONS AND THE LIKE.

1,037,028.

Specification of Letters Patent. Patented Aug. 27, 1912.

Application filed January 17, 1911. Serial No. 603,144.

*To all whom it may concern:*

Be it known that I, ALBERT LODGE, a citizen of the United States, residing at East Falls, Philadelphia, in the county of Philadelphia and State of Pennsylvania, have invented new and useful Improvements in Driving Mechanism for Toy Wagons and the Like, of which the following is a specification.

This invention relates to wagons and more particularly to toy wagons, and the object of the invention is the provision of a simple and efficient driving mechanism for the vehicle which may be cheaply constructed and which will be efficient in operation.

Further objects of the invention will appear as the following specific description is read in connection with the accompanying drawing, which forms a part of this application, and in which:—

Figure 1:
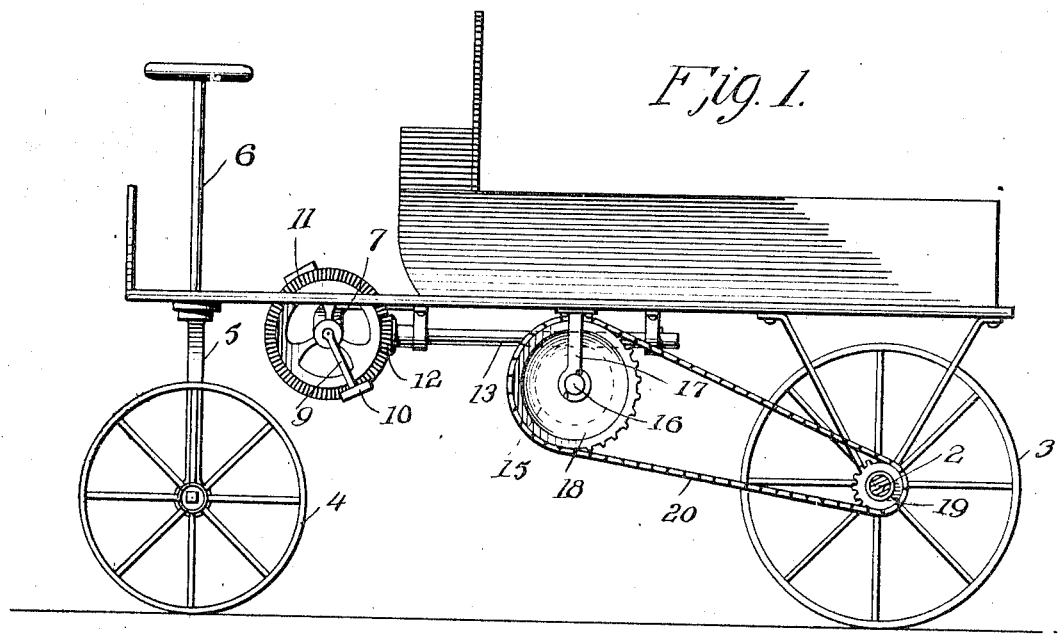
Figure 2:
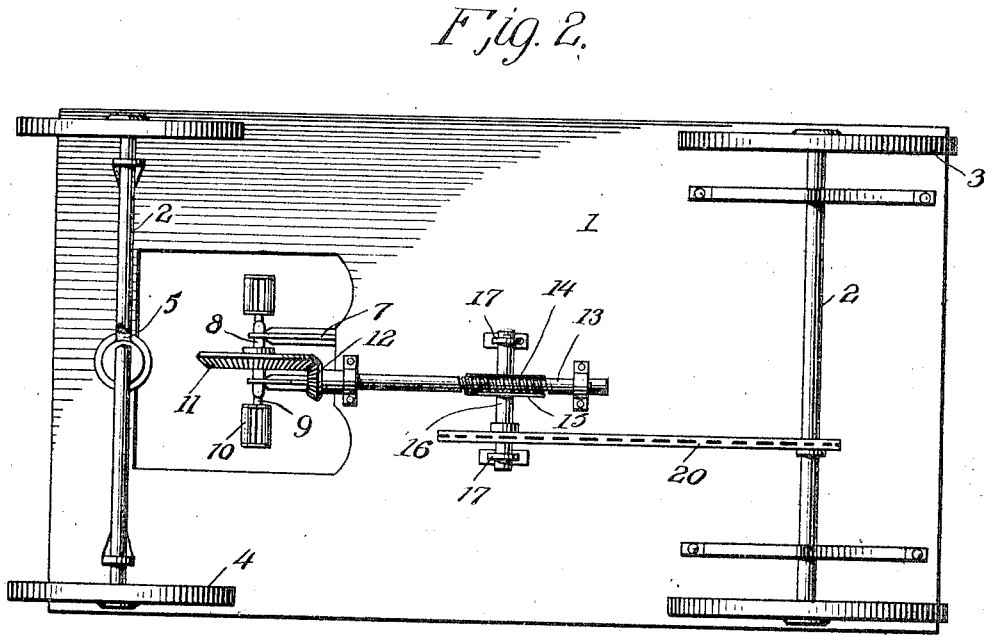

Figure 1 is a side elevation. Fig. 2 is a bottom plan view.

Referring more particularly to the drawing, 1 represents the body which is mounted upon axles 2 carrying the wheels 3 and 4. The front axle 2 is mounted so as to be turned upon a king pin 5 which, in this instance, is connected to a steering post 6. This guiding arrangement may be varied to suit conditions and forms no part of my invention. Mounted upon the under side of the body is a crank hanger 7 in which a crank shaft 8 is journaled. This crank shaft is provided with the usual pintle cranks 9 carrying pintles 10 and has also secured thereto a bevel gear 11 which is in mesh with a pinion 12 carried upon a longitudinal worm shaft 13. This worm shaft is provided with a worm 14 which engages a worm wheel 15 upon a transverse shaft 16 journaled in bearings 17 depending from the bottom of the body. Adjacent one end of the shaft 16 there is secured thereto a sprocket wheel 18 which is connected to a smaller sprocket 19 upon the rear axle 2 by a sprocket chain 20. The gear 11 may be weighted so as to act as a fly wheel or the sprocket wheel or the worm wheel may be weighted, but as this is a common expedient I have not shown the same herein.

I claim:—

In combination, a wagon body having an apertured floor and a running gear, brackets secured to the floor and extending partially across the aperture, a crank shaft journaled in said brackets, a bevel gear mounted upon the crank shaft, a transmission shaft having a worm thereon and a pinion to engage said bevel gear, a worm wheel in mesh with the worm on the transmission shaft, a sprocket wheel connected to said worm wheel, a flexible driving connection between the sprocket wheel and the running gear of the wagon, and pedals on the crank shaft exposed through the aperture.

In testimony whereof I affix my signature in presence of two witnesses.

ALBERT LODGE.

Witnesses:
 FREEMAN H. BAXTER,
 WILLIAM HY. RALEIGH.